United States Patent
Katsushima et al.

[11] 3,919,361
[45] Nov. 11, 1975

[54] POLYFLUOROALKYL HYDROXYPROPYL PHOSPHATES

[75] Inventors: Atsuo Katsushima, Takarazuka; Shinichi Imazu; Shoshin Fukui, both of Toyonaka; Akitoshi Iwatani, Suita; Tadashi Akazawa, Ibaragi, all of Japan

[73] Assignee: Daikin Kogyo Kabushiki Kaisha, Osaka, Japan

[22] Filed: Mar. 20, 1974

[21] Appl. No.: 452,968

[30] Foreign Application Priority Data
Mar. 23, 1973 Japan............... 48-33320

[52] U.S. Cl. ............... 260/953; 8/115.6; 260/977
[51] Int. Cl.² ............... C07F 9/11; D06C 27/00
[58] Field of Search ............... 260/953

[56] References Cited
UNITED STATES PATENTS
2,372,244  3/1945  Adams et al............. 260/953
3,474,046  10/1969  Pelletier et al............ 260/953 X Primary Examiner—Anton H. Sutto
Attorney, Agent, or Firm—Armstrong, Nikaido & Wegner

[57] ABSTRACT

A polyfluoroalkyl hydroxypropyl phosphate having the formula

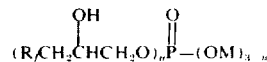

wherein $R_f$ is a polyfluoroalkyl group having 1 to 24 carbon atoms, $n$ is an integer of 1 to 3 and M is a hydrogen atom, alkali metal, ammonium radical or substituted ammonium radical, said compound being useful as a sizing composition for paper, water-and oil-repellent composition, etc.; and a method for producing the above compound by reacting a polyfluoroalkyl propylene expoxide with a phosphoric acid.

2 Claims, No Drawings

POLYFLUOROALKYL HYDROXYPROPYL PHOSPHATES

This invention relates to a novel class of polyfluoroalkyl-containing compounds, more particularly to novel polyfluoroalkyl hydroxypropyl phosphates and the manufacture of the same.

A main object of the invention is to provide novel polyfluoroalkyl hydroxypropyl phosphates which contain one functional alcoholic hydroxyl group in the molecule and are useful as sizing agents for paper, water- and/or oil-repellent agents, oil barriers, surface active agents and additives for hydraulic operating fluids and lubricating oils.

Another object of the invention is to provide a process for manufacturing novel polyfluoroalkyl hydroxypropyl phosphates having the above uses.

These and other objects of the invention will be apparent from the following description.

The polyfluoroalkyl hydroxypropyl phosphates of the present invention are those represented by the formula

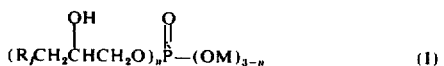

wherein $R_f$ is a polyfluoroalkyl group having 1 to 24 carbon atoms, $n$ is an integer of 1 to 3 and M is a hydrogen atom, alkali metal, ammonium radical or substituted ammonium radical.

The phosphates having the above formula (I) of the present invention, when applied to fibrous materials, impart excellent sizing effect or water- and/or oil-repellency to the material treated therewith. particularly, it is to be noted that the present phosphates (I) are those derived from difunctional polyfluoroalkane diols and contain at least one functional alcoholic hydroxyl group in the molecule. Due to the presence of the functional alcoholic hydroxyl group the present compounds display unique properties useful as sizing agents, water- and/or oil-repellent agents, etc. For example, when the present compounds (I) are applied to fibrous materials such as paper, cloth, leather, etc. and subjected to heat treatment, they produce water- and/or oil-repellent coatings thereon having excellent durability, particularly resistance to heat, water, chemicals and washing. This is attributable to the fact that due to the presence of functional alcoholic hydroxyl group the present phosphates (I) are easily condensed with one another by heat treatment conducted in the presence or absence of appropriate curing agents such as polybasic acids to produce a polymer coating firmly bonded with fibrous material treated therewith and having excellent properties to resist heat, water, chemicals and washing. Such durable coating can not be obtained with conventional polyfluoroalkyl phosphates derived from monofunctional polyfluoroalkane monools and having no functional alcoholic hydroxyl group in the molecule.

Thus the present phosphates (I) are useful as sizing agents for paper, water- and/or oil-repellent agents. Further, utilizing the oil-repellent property the present phosphates (I) can be also used as oil barriers. Since the present phosphates have unique surface activity, moreover, they are also useful as surface active agents. Furthermore, the present phosphates impart excellent antifriction property or anticorrosion property to hydraulic operating oils or lubricating oils, when added thereto, and are therefore useful as additives for such oils. In addition thereto the present phosphates have properties capable of imparting soil resistant property, non-flammability, antistatic property, non-tackiness, releasing property, etc., to various articles such as paper, fabrics, leather, etc., and are therefore employable in the uses in which such properties are required.

Of the present phosphates preferable are those having the formula (I) in which $R_f$ is a perfluoroalkyl group having 1 to 24 carbon atoms, the most preferable being those in which $R_f$ is a perfluoroalkyl group having 5 to 19 carbon atoms. Further, mono- or di- phosphates (i.e., $n = 1$ or 2) are preferable.

The polyfluoroalkyl hydroxypropyl phosphates (I) of the present invention can be prepared by various methods. According to one of the preferred methods, the present phosphates having the formula (I) in which M is a hydrogen atom can be obtained by reacting a phosphoric acid with the corresponding polyfluoroalkyl propylene epoxide having the formula

wherein $R_f$ is the same as defined before. The phosphates (I) thus obtained in the form of free acid (M=H) is converted into a salt by neutralization with an appropriate base, if necessary.

The polyfluoroalkyl propylene epoxides (II) to be used as a starting material are known compounds which are liquid or solid at room temperature and can be easily prepared. According to one of preferred methods to produce the epoxides (II), a polyfluoroalkyl iodide having the formula of $R_fI$, wherein $R_f$ is the same as defined before, is radically reacted with allyl alcohol to produce an iodine-containing alcohol having the formula of $R_fCH_2CHICH_2OH$, wherein $R_f$ is the same as defined before, and the resulting alcohol is subjected to dehydrogen iodide reaction in an aqueous solution of an alkali metal hydroxide to produce the desired epoxide (II). Examples of the polyfluoroalkyl propylene epoxides are:

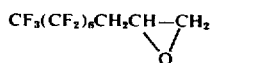

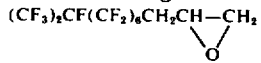

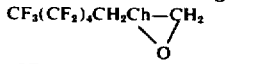 (mixture of epoxides with p ranging from 3 to 7)

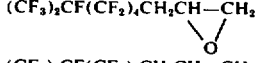

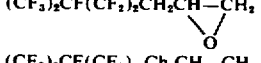

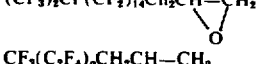

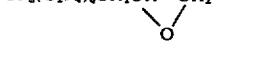

$CF_3(C_2F_4)_qCH_2CH-CH_2$ (mixture of epoxides with q ranging from 1 to 9)

Of these preferable are those having the formula (II) above in which $R_f$ is a perfluoroalkyl group of 1 to 24 carbon atoms, particularly 5 to 19 carbon atoms.

The phosphoric acids to be used in the above method include, for example, orthophosphoric acid, metaphosphoric acid, pyrophosphoric acid, etc., preferable being orthophosphoric acid. Particularly, it is preferable to employ orthophosphoric acid having a concentration of about 80 to 100 wt.%, the most preferable concentration thereof being about 100 wt.%.

The esterification reaction between the polyfluoroalkyl propylene epoxide (II) and phosphoric acid to produce the present phosphate (I) can be carried out in the presence or absence of organic solvents such as isopropyl alcohol, ethyl acetate, 1,1,3-trichlorotrifluoroethane, etc. The phosphoric acid can preferably be used in a stoichiometric or excessive amount, e.g., in an amount of 1 to 4 moles per mole of the starting epoxide (II). The reaction temperature is usually in the range of 0° to 100°C, but a temperature of 30° to 95°C is the most preferable. Usually catalysts are not necessary in the reaction, but an organic amine, alkali and like catalysts can be used, where required.

The present phosphate (I) thus obtained in the form of free acid (M=H) can be easily separated from the resulting reaction mixture by washing the mixture with water to remove the excessive phosphoric acid. If organic solvent is used, the mixture is washed with water to remove the excessive phosphoric acid after the solvent is removed by distillation.

The present phosphate (I) can also be prepared by reacting a phosphoric acid with a polyfluoroalkyl propane diol having the formula

(III)

wherein $R_f$ is the same as defined before. The reaction can be preferably conducted in the presence of concentrated sulfuric acid or like dehydrating agents.

Where necessary, the present phosphate (I) in which M is a hydrogen atom can be converted into salts by neutralization with an appropriate base. The bases to be used are ammonia; sodium hydroxide, potassium hydroxide and like alkali metal hydroxides; and alkyl amines such as ethyl amine, diethyl amine, triethyl amine, butyl amine, hexyl amine, tetraalkyl ammonium bases, etc., alkanol amines such as ethanol amine, diethanol amine, triethanol amine, etc., alicyclic amines such as morpholine etc. and aromatic amines such as aniline etc. and like commonly available water-soluble amines. By the use of the amines substituted ammonium salts are obtained. Preferable amines are alkyl amines having 1 to 6 carbon atoms.

The present phosphates of free acid type having the formula (I) in which M is a hydrogen atom are easily soluble in water-soluble organic solvents such as methanol, ethanol, isopropyl alcohol, acetone, tetrahydrofuran, dioxane, etc., while the phosphates of salt type having the formula (I) in which M is an alkali metal, ammonium radical or substituted ammonium radical are easily soluble not only in the water-soluble organic solvents but also in water. Therefore, when used as a sizing agent for paper or water- and/or oil-repellent agent, the acid-type phosphate is first dissolved in the water-soluble organic solvents to produce an original composition and diluted with water before using. In the case of the salt-type phosphate, it is directly dissolved in water to produce an original composition, which is diluted with water before using. The original composition of the salt-type phosphate can also be prepared using water-soluble organic solvents, as in the case of the acid-type phosphate. It is preferable that the original composition have a concentration of 10 to 90 weight percent and be diluted with water before using, to a concentration of 0.01 to 2 wt.% for sizing treatment and of 0.01 to 10 wt.% for water- and/or oil-repellent treatment.

The diluted composition is applied to an article to be treated such as paper, cloth, leather and like fibrous materials by dipping, coating or spraying and then dried. To improve durability, if desired, the article thus treated is subjected to a heat treatment usually conducted at an elevated temperature of 110° to 250°C for 10 seconds to 15 minutes. By the heat treatment the condensation polymer coating of the phosphate is produced on the treated article, rendering the article durable to heat, water, chemicals and washing. Where required, curing agents such as phosphoric acids and like polybasic acids can be added to the composition or applied to the article treated with the composition.

For a better understanding of the invention examples are given below in which all parts and percentages are by weight.

EXAMPLE 1

In a three-necked flask was placed 100 parts of perfluoroisopentyl propylene epoxide having the formula

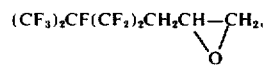

to which 42.5 parts of orthophosphoric acid having a concentration of 85% was added dropwise with stirring over 15 minutes. The mixture was kept at 80°C to effect esterification reaction. The reaction was terminated after 2 hours, when the starting epoxide was found to be completely consumed in the reaction by gas chromatography. The resulting reaction mixture was washed with water repeatedly, until $PO_4^{+++}$ was not detected in the washings, followed by drying at 30°C in vacuo, whereby 128 parts of 3-perfluoroisopentyl-2-hydroxypropyl phosphate was obtained. Yield was 98%. The product was a solid, white in color and soluble in acetone, isopropyl alcohol, ethyl acetate and trichlorotrifluoroethane. the elementary analysis of the product gave the following results:

|  | P | C | F |
|---|---|---|---|
| Found | 7.3% | 22.6% | 49.3% |
| Calcd. | 7.2% | 22.6% | 48.9% |

$[(CF_3)_2CF(CF_2)_2CH_2CH(OH)CH_2OPO(OH)_2]$ 10 parts of the product thus obtained was dissolved in 40 parts of isopropyl alcohol, and 50 parts of water was added thereto. To the resulting solution 28% ammonia water was added until the solution became neutral, whereby diammonium 3-perfluoroisopentyl-2-hydroxypropyl phosphate was obtained in the form of aqueous solution.

To determine the sizing effect and water- and oil-repellent effect of the product, following tests were conducted.

1. Preparation of samples to be tested.

3-perfluoroisopentyl-2-hydroxypropyl phosphate,

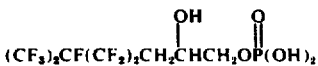

obtained in the above Example 1 was dissolved in isopropyl alcohol to a concentration of 50%, and the solution was diluted with water to a concentration of 1%.

Paper to be sized, weighing 45g/m² was impregnated with the diluted solution by Tub sizing method, pressed at a nip pressure of 1 Kg/cm², dried in air for 1 hour and heated at 125°C for 4 minutes. The paper thus treated was conditioned at 25°C at a relative humidity of 65% and subjected to the following tests.

2. Test method.

Sizing effect and water- and oil-repellency were determined by the following methods.

Sizing effect: JIS P-8122 (1954)
Water-repellency: JIS P-8137 (1961)
Oil-repellency: AATCC 118-1966 T 3. Results.

The test results are shown in Table 1 below, which also shows for comparative purpose the results obtained in the same manner as described above using the known polyfluoroalkyl-containing phosphate, i.e., $$C_8F_{17}SO_2N(C_2H_5)CH_2CH_2OP(OH)_2.$$

Table 1

|  | Sizing effect (sec.) | Water-repellency | Oil-repellency |
|---|---|---|---|
| Example 1 | 29 | $R_4$ | 4 |
| Comparison | 14 | $R_3$ | 3 |
| Untreated paper | 0 | $R_0$ | 0 |

Further, to determine the anticorrosion property of the present compound 0.1 part of

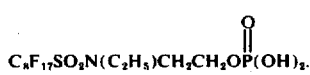

was added with stirring to 100 parts of polychlorotrifluoroethylene oil, $Cl(C_2ClF_3)_rCl$ in which $r$ is an average number of 4 to 7. A test piece of well-polished steel was immersed in the mixture, and left to stand for a few days after distilled water was added thereto. The test piece was inspected with the unaided eye, but no rust was detected, whereas the control test which was conducted in the same manner as above without using the present phosphate gave the result that rust was detected within one-hour standing.

EXAMPLE 2

In a 500-ml three-necked flask equipped with a reflux condenser were placed 100 parts of perfluoroisononyl propylene epoxide of

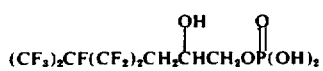

200 parts of isopropyl alcohol and 11 parts of orthophosphoric acid having a concentration of 85%. The mixture was heated under refluxing condition to effect esterification reaction. The reaction was terminated after 3 hours, when the epoxide was found to be completely consumed in the reaction by gas chromatography.

The resulting reaction mixture was evaporated to dryness, and the residue was pulverized and washed with water repeatedly, until $PO_4^{+++}$ was not detected in the washings, followed by drying at 30°C in vacuo whereby 105 parts of product was obtained. The product was found to be di(3-perfluoroisononyl-2-hydroxypropyl) phosphate by elementary analysis and infrared absorption analysis.

20 parts of the phosphate thus obtained was dissolved in 80 parts of isopropyl alcohol, and 5 parts of the resulting solution was diluted with 95 parts of water to obtain 1% aqueous solution of the phosphate. Polyestercotton blended broad cloth was dipped in the solution and squeezed to 100%. After being dried at 80°C for 10 minutes, the cloth was heated at 150°C for 5 minutes. No change was observed in appearance. The cloth thus treated was tested to determine water repellency and oil repellency in accordance with AATCC 22-1952 and 118-1966T respectively. The test results are shown below:

| Water repellency: | 80 |
|---|---|
| Oil repellency | 6 |

EXAMPLE 3

In a three-necked flask equipped with a reflux condenser were placed 263 parts of perfluoro-n-nonyl propylene epoxide of

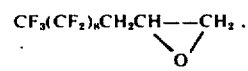

250 parts of trichlorotrifluoro ethane and 60 parts of orthophosphoric acid having a concentration of 100%. The mixture was heated under refluxing condition to effect esterification reaction. The reaction was terminated after 5 hours, when the epoxide was found to be completely consumed in the reaction by gas chromatography.

The resulting reaction mixture was evaporated to dryness, and the residue was pulverized and washed with water repeatedly, until $PO_4^{+++}$ was not detected in the washings, followed by drying at 30°C in vacuo, whereby 280 parts of mono-(3-perfluoro-n-nonyl-2-hydroxypropyl phosphate was obtained. The yield was 92%. The product was solid, white in colour and the elementary analysis thereof gave the following results:

|  | P | C | F |
|---|---|---|---|
| Found | 5.1% | 23.3% | 57.6% |
| Calcd. | 5.0% | 23.1% | 57.9% |

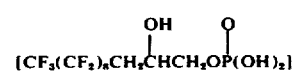

EXAMPLE 4

In a three-necked flask were placed 241 parts of pentadecafluoroisoundecyl propylene epoxide having the formula of

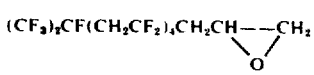

and 60 parts of orthophosphoric acid having a concentration of 100%. The mixture was heated at 80°C to effect esterification reaction. The reaction was terminated after 1 hour, when the starting epoxide was found to be completely consumed in the reaction by gas chromatography.

The resulting reaction mixture solidified at room temperature was pulverized and washed with water repeatedly, until $PO_4^{+++}$ was not detected in the washings, followed by drying at 30°C in vacuo, whereby 255 parts of mono-(3-pentadecafluoroisoundecyl-2-hydroxypropyl) phosphate was obtained. Yield was 88%. The product was solid, white in colour and the elementary analysis thereof gave the following results:

|  | P | C | F | H |
|---|---|---|---|---|
| Found | 5.3% | 29.2% | 48.9% | 2.7% |
| Calcd. | 5.3% | 29.0% | 49.1% | 2.8% |

EXAMPLE 5

In a three-necked flask were placed 326 parts of perfluoroisopentyl propylene epoxide and 24.5 parts of orthophosphoric acid having a concentration of 100%. The mixture was heated at 80°C for 5 hours to effect esterification reaction.

The resulting reaction mixture solidified at room temperature was pulverized and washed with water repeatedly, until $PO_4^{+++}$ was not detected in the washings. The washed reaction mixture was dried at 50°C in vacuo to remove the unreacted epoxide, whereby 245 parts of tri-(3-perfluoroisopentyl-2-hydroxypropyl) phosphate was obtained. Yield was 91%. The product was solid, white in colour and the elementay analysis thereof gave the following results:

|  | P | C | F |
|---|---|---|---|
| Found | 3.0% | 26.5% | 58.0% |
| Calcd. | 2.9% | 26.8% | 58.3% |

EXAMPLE 6

In a three-necked flask were placed 293 parts of the following perfluoroalkyl propylene epoxide mixture and 25 parts of orthophosphoric acid having a concentration of 100%.

The perfluoroalkyl propylene epoxide mixture used:

a) Formula

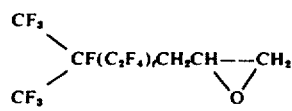

b) Composition

| t | % |
|---|---|
| 3 | 55 |
| 4 | 26 |
| 5 | 12 |
| 6 | 5 |
| 7 | 2 |

The resulting mixture was heated at 95°C to effect esterification reaction. The reaction was terminated after 3 hours, when the starting epoxide was found to be completely consumed in the reaction by gas chromatography.

The resulting reaction mixture solidified at room temperature was pulverized and washed with water repeatedly, until $PO_4^{+++}$ was not detected in the washing, followed by drying at 30°C in vacuo, whereby 302 parts of solid product, white in colour was obtained. The product had a softening point of 70° to 80°C and the yield was 95%.

The product thus obtained was dissolved in isopropanol to produce a solution having a concentration of 20% and diluted with water to a concentration of 0.5%. Using the diluted composition sizing effect and water- and oil-repellency were determined in the same manner as in Example 1 with the following results.

| Sizing effect (sec.) | 20 |
|---|---|
| Water-repellency | $R_6$ |
| Oil-repellency | 5 |

EXAMPLE 7

10 parts of the phosphate obtained in Example 6 was dissolved in 20 parts of isopropanol and diluted with 70 parts of water. To the resulting solution was added each of the following bases in an amount equivalent to the acid value of the phosphate, whereby the corresponding salt of the phosphate was obtained in the form of aqueous solution.

Base used:
a. 35% ammonia water
b. Diethanol amine
c. Morpholine

The solution was diluted with water to a concentration of 0.5% and subjected to the same tests as in Example 1 with the following results.

| Base used: | (a) | (b) | (c) |
|---|---|---|---|
| Sizing effect (sec) | 15 | 16 | 17 |
| Water repellency | $R_2$ | $R_2$ | $R_1$ |
| Oil repellency | 5 | 5 | 5 |

We claim:
1. A polyfluoroalkyl hydroxypropyl phosphate having the formula

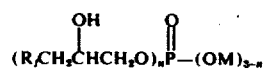

wherein $R_f$ is a polyfluoroalkyl group having 1 to 24 carbon atoms, n is an integer of 1 to 3 and M is a hydrogen atom, alkali metal, ammonium radical or substituted ammonium radical derived from water-soluble amines and having as a substituent thereon an alkyl, hydroxyalkyl, alicyclic or aromatic groups.

2. The polyfluoroalkyl hydroxypropyl phosphate according to claim 1, in which said n is 1 to 2.

* * * * *